S. HULL.
Harvester.

No. 43,116.

2 Sheets—Sheet 1.

Patented June 14, 1864.

Witnesses:
A. J. Campbell
E. Hefenh

Inventor:
Stephen Hull

S. HULL.
Harvester.

No. 43,116.

2 Sheets—Sheet 2.

Patented June 14, 1864.

Witnesses
Inventor

UNITED STATES PATENT OFFICE.

STEPHEN HULL, OF POUGHKEEPSIE, NEW YORK.

IMPROVEMENT IN HARVESTERS.

Specification forming part of Letters Patent No. 43,116, dated June 14, 1864.

*To all whom it may concern:*

Be it known that I, STEPHEN HULL, of Poughkeepsie, Dutchess county, State of New York, have invented certain new and useful Improvements in Harvesting-Machines; and I do hereby declare that the following is a full, clear, and exact description thereof, reference being had to the accompanying drawings, making a part of this specification, in which—

Figure 1:
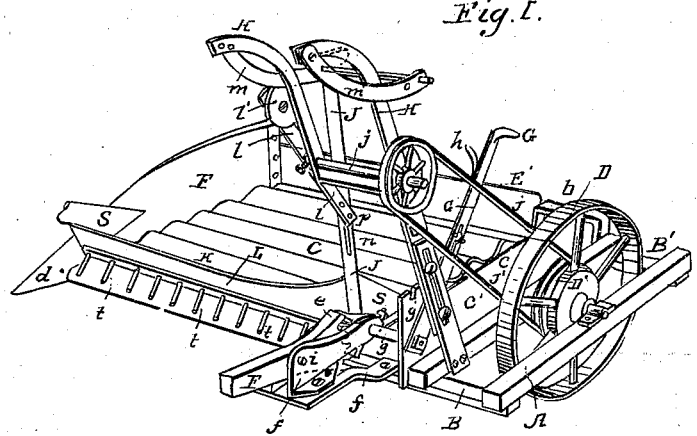
Figure 2:
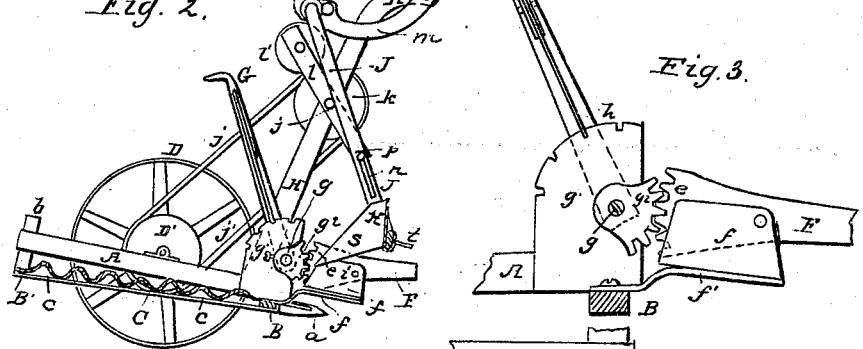
Figure 3:
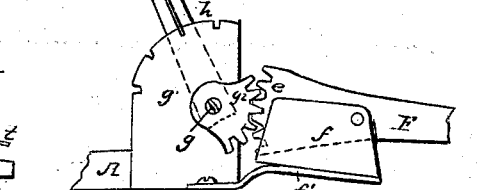
Figure 4:
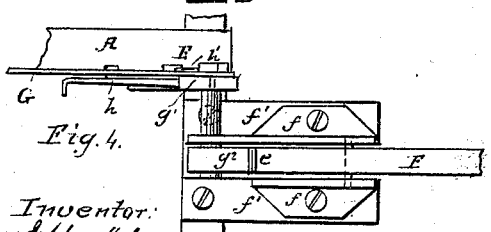
Figure 5:
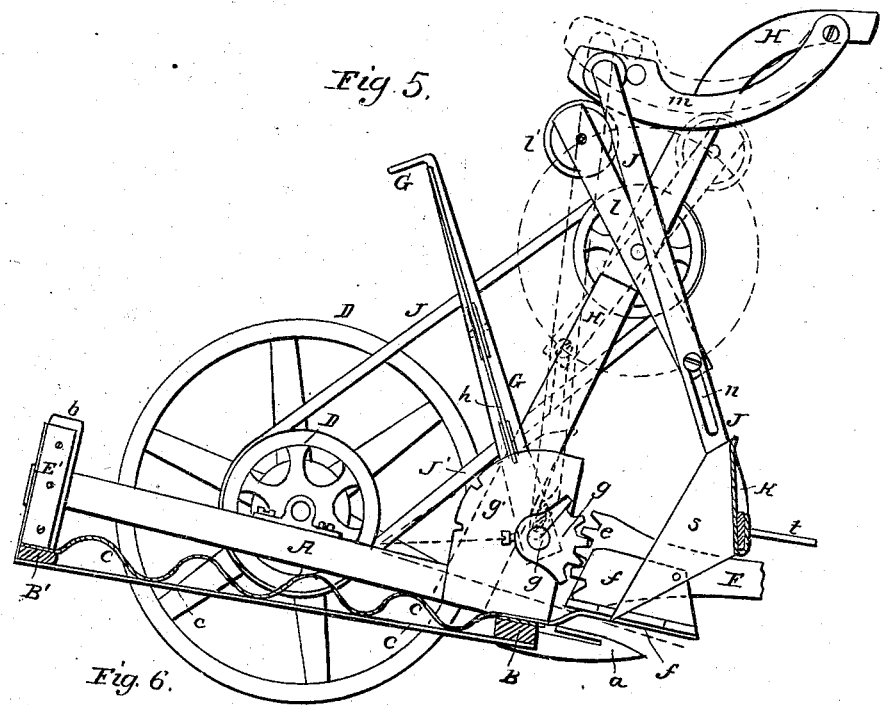
Figure 6:
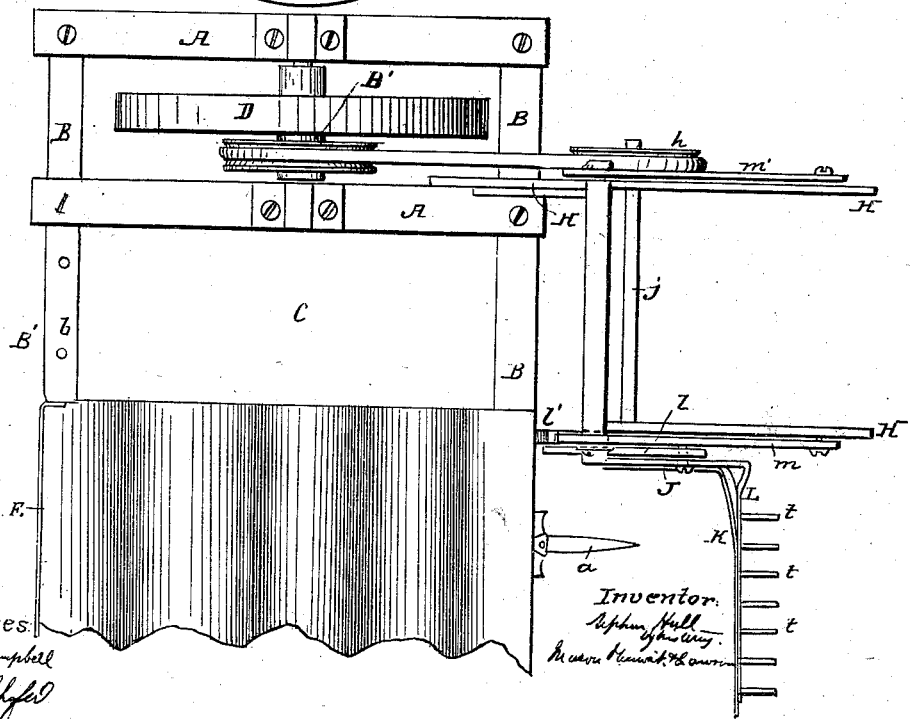

Figure 1 is a perspective view of my improved machine. Fig. 2 is a vertical longitudinal section of the platform, looking toward the frame of the machine. Figs. 3 and 4 show the device for adjusting the forward end of the machine for high or low grass or grain. Fig. 5, Sheet 2, shows the gathering apparatus applied to the machine and indicated in two positions. Fig. 6 is a top view of the frame of the machine and a portion of the platform and gathering apparatus.

Similar letters of reference indicate corresponding parts in the several figures.

The object of my invention is to avoid the objection to the revolving reels hitherto employed for gathering the standing grain upon the platform of reaping-machines, and to obtain an automatic gatherer which is so arranged and operated as to have a rectilinear movement faster than the forward movement of the machine during the entire gathering stroke, and then to rise over the standing grain and repeat the operation of gathering, as will be hereinafter described.

My invention also has for its object constructing the platform or apron of the machine in such manner as to facilitate the raking of the cut product therefrom, and also to combine in a single platform great strength with lightness and durability, as will be hereinafter described.

To enable others skilled in the art to make and use my invention, I will proceed to describe its construction and operation.

The frame A of my machine consists of two longitudinal bars or beams, which are secured to transverse bars or beams B B', the forward one, B, of which extends out at right angles to the wheel-frame, and forms the forward support for the platform C, and also the finger-bar, to which the fingers or teeth *a* are secured. The rear brace, B', is also extended out at right angles to the wheel-frame parallel to the forward bar, B. This bar or brace B' is curved upward, so as to form a bridge, *b*, which is carried up sufficiently high to allow the cut product which is raked off the platform at one side to pass under it, or rather to allow this bridge to pass freely over the gavel. This rear brace, B', forms the rear support for the apron or platform C, and its curved bridge *b* forms a firm elevated support for the raker's seat. The outer ends of the two extended bars, B B', are connected together by a longitudinal brace, and at a suitable point between this longitudinal brace and the wheel-frame a second brace, *c*, is applied, which, together with the outer brace, form the two side supports for the apron C. Thus it will be seen that the two longitudinal bars of the wheel-frame are connected together and braced by two transverse bars which are so arranged and constructed as to allow the cut product to pass over the forward bar and under the rear bar at one side of the platform.

The outer end of the machine is supported by the single wheel D, having a grooved pulley-wheel, D', keyed to its axle on that side nearest the standing grain. The inner end of the platform is supported upon a small wheel, (not shown in the drawings,) which may be applied so as to allow this end of the machine to be raised or lowered, as the occasion may require.

To the bars B B' and longitudinal braces of these bars, which constitute the platform of the machine, I apply a corrugated sheet-metal plate (or plates) and suitably rivet or bolt this plate to the frame, and thus obtain a platform the surface of which is waved or ridged, the ridges being arranged at right angles to the wheel-frame, so that the grain which falls on this platform will be supported upon the highest points of said ridges in a condition to be readily raked off at one side.

By making the apron or covering of the platform of sheets of waved or corrugated metal, firmly secured to the frame thereof, it will be seen that the great strength and stiffness obtained by the use of such plates will enable me to make the transverse bars or extended braces B B of the wheel-frame very light; but the greatest advantage derived from the use of corrugated plates is in the facility which they afford the raker in raking the gavel off the platform. The rake will take a better hold on the gavel lying on the ridges, and there will be less resistance offered to the gavel by these ridges than with ribbed or slatted surface platforms hitherto used.

The machine represented in the drawings is intended for side delivery, the gavels being raked off the platform so as to fall between the inner bar of the wheel-frame and the outer bar, c, of the platform, and a wide space, C', is left for this purpose, which being bridged by the bar B', the machine will pass on and leave the grain undisturbed.

The inner end of the platform is provided with the usual guard-board, E, which may have a fixed or hinged tooth extension or divider, d, on its forward end, and the back edge of this platform is also provided with a guard-board or plate, E', which latter prevents any grain from falling off the platform at this point.

To the forward part of the machine I apply a device by means of which the driver, while sitting in his seat, can raise or depress this forward end of the machine at pleasure. This device consists in applying on the rear end of the pivoted draft-pole F a toothed segment, e, which works in a vertical plane. The draft-pole F is pivoted at i between the jaws of a box, f, which is secured to the forward projecting plate, f', which latter is firmly bolted to the forward brace-bar, B, as shown clearly in Figs. 1, 3, and 4. The rear part of one of the jaws f is extended back and forms a bearing for the rock-shaft g, which also has another bearing in the notched gage-plate g'. This shaft has keyed to it a toothed segment, $g^2$, which engages with and operates the rear end of the draft-pole F; and there is also secured to this shaft a long hand-lever, G, projecting upward alongside of the plate g', and above this plate a suitable distance to be convenient for the driver while sitting in his seat. On one side of this lever, and applied to it in such manner as to have an endwise play, is a spring-latch, h, the lower end of which catches into one or the other of the notches formed in the curved edge of the gage-plate g'. This latch-bar h is held down in its place by a spring, h', or in any other suitable manner, and its upper end is curved so as to form a handle, by means of which the driver or operator can release the latch-fastening and adjust the machine at one time and with one hand. The draft-pole F being supported at its forward end by the horses and held in place by the latch h and segment $g^2$ by moving the lever G back or forward—vibrating this lever—the rear end of the pole F will be raised or depressed, and the front end of the machine adjusted accordingly.

Near the forward end of the wheel-frame A, I have erected a frame, H, which is forked at its upper end, and curved in a suitable manner to support the levers and the gathering-palm, which is actuated by these levers. The motive power which gives motion to this gathering apparatus is communicated to the transverse shaft j from the pulley D' through the medium of belt j' and pulley k. The shaft j carries on its end nearest the standing grain an arm, l, the ends of which extend out at equal distances from its shaft. On one end of this arm l is a friction-wheel, l', and attached to the opposite end is a vibrating arm, J, which has its pivot-bearings in the rear ends of two vibrating curved arms or cams, m m', that are pivoted at their forward ends to the extreme upper ends of the frame H, as shown in Figs. 1, 2, 5, and 6. These arms m m' receive a vibrating motion from the arm l, which acts directly upon the arm m in one part of the revolution and through the medium of vibrating arm J in another part of its revolution. The end of arm l, attached to the arm J, which carries the gatherer, is connected to this arm l by means of a pin passing through an oblong slot, n, which latter allows the opposite end of l to raise the arms m m', and consequently the gatherer on the end of arm J, at the same time the gatherer is moved backward to perform its acting stroke, thus moving the gather in a plane parallel, or nearly so, to the surface of the ground over which the machine is moving, and causing it to press the grain well over the platform before leaving it. If the end of arm l were merely pivoted to the swinging gathering-arm J, the lower end of this latter arm would move in the path of a circle and operate upon the grain precisely as a common reel would; but by the arrangement of arms above described it will be seen that after the gatherer completes one stroke backward, or has moved to the position indicated by red lines, Fig. 5, the pin p will act upon and lift the gathering-arm J and move it in the arc of a circle over the next swath of standing grain, and then allow it to descend again into the standing grain to the position shown in black lines, Figs. 2 and 5, in which position the friction-wheel l' on the crank-arm l will be brought into action and move the arm J upward in such a ratio to its backward motion that the gatherer on the lower end of this arm will now move in the path of a plane or straight line parallel to the surface of the ground a sufficient distance to gather in the swath and spread it on the platform. By this arrangement the gatherer performs the same movement automatically that a man would perform with a hand-rake. By my invention a single rotating arm or lever, l, causes the two movements of the gathering-arm.

The several pivot-bearings and connections of the vibrating and rotating arms may be changed, so that they will have different relations to each other than what I have represented in the drawings. The standard of the gatherer-frame H is made in two sections, connected together by bolts passing through a slot, as shown in Fig. 1, for the purpose of adjusting the height of this frame according to the height or condition of the grain.

The form and construction of the gatherer, which is attached to the lower end of the vibrating arm J, may be varied according to circumstances; but that shown in the drawings will be found well suited to the purpose.

It consists of a wide plate or board, K, of a proper length, secured to a bar, L, which extends out at right angles to the arm J and parallel to the surface of the platform. On each end of this plate K, I form or attach tapering teeth or dividers $s\ s$, which prevent the grain from escaping at the ends of the gatherer during the action thereof upon the grain. These dividers $s\ s$ may be spread out laterally more or less, according to the amount of grain it is desired to gather and cut. From the front side of the gatherer project a number of teeth or pins, $t\ t$, which are secured into the stiffening-bar L in such positions as to pass between the stalks of grain during the gathering-stroke and direct the grain properly up to the cutters, and also rake the cut grain well upon the platform and out of the way of the cutters. Instead of having the supporting-frame upon one side of the machine only, as in Fig. 1, the gatherer may be supported by means of uprights applied on each side of the machine, one of which would be attached to the wheel-frame and the other to the inner side of the platform; but the mode of supporting the gatherer in a side frame, as above described, will be found to serve a very good purpose, and will be out of the way of the standing grain.

As it is essential to the perfect operation of my peculiar grain-gatherer that a means for lowering it instantly, so as to get under the tangled or depressed grain which may come in its way, be provided, I have shown a contrivance for this purpose, and as this contrivance is new and better adapted to my machine than anything heretofore devised, I desire to be protected in the use of the same.

Having thus described my invention, what I claim as new, and desire to secure by Letters Patent, is—

1. The extended braces B B' of the wheel-frame A, so constructed and arranged as to constitute the supports for the apron C, and also an elevated bridge, $b$, for the driver's seat, substantially as described.

2. A reciprocating reel-bar which is reciprocated by a revolving eccentric axis, and itself reciprocates vertically, or nearly so, on said axis, substantially as and for the purpose described.

STEPHEN HULL.

Witnesses:
ROBT. N. PALMER,
H. D. VARICK.